3,159,487
PHOTOSENSITIVE DIAZOTYPE MATERIAL COMPRISING A STARCH, SILICA AND A BINDER
Wilhelm A. Krieger, Summit, and Leonard May, Union, N.J., assignors to Keuffel & Esser Company, Hoboken, N.J., a corporation of New Jersey
No Drawing. Filed Sept. 21, 1961, Ser. No. 139,588
9 Claims. (Cl. 96—75)

This invention relates to diazotype light sensitive materials of the type commonly used for the reproduction of engineering drawings.

In this art various types of carriers for the light sensitive diazo compound and other chemicals have been used. For example, Jahoda Reissue Patent #23,510 discloses the use of colloidal silica as a precoat. Von Glahn Patent #2,566,709 discloses the use of colloidal silica in the sensitizing solution. Jahoda Patent #2,726,956 discloses the use of a precoat of a suspension of styrene resin particles. Ferzola et al. Patent #2,780,547 discloses the use of rice starch as a carrier for diazotype chemicals with a binder for the particles of the starch.

Prior to the present invention it was believed that only non-swollen rice starch could be used and that silica could not be used with starch and Ferzola et al. #2,780,-547 stated that silica with rice starch produces discoloration. Contrary to the teachings of the Ferzola patent applicants have been able to use other than rice starch with silica and a binder and obtain improved results.

Now it has been found that other types of starch such as corn starch, wheat starch, tapioca starch, potato starch and others can be used instead of the more expensive rice starch with even superior results provided either colloidal or small size non-colloidal silica is incorporated with the starch particles and the binder. Under some circumstances it may be advantageous to pass the starch through a colloid mill before it is incorporated with the other ingredients. For example, the starch may be dispersed in water in the proportion of 1 kg. starch to 1 gallon of water and then run through the mill.

The silica used according to the present invention may be of colloidal or non-colloidal particle size. For example, any of the following types of silica which are listed with their particle size may be used:

Santocel CX _____ 0.5 to 2 microns diameter.
Santocel C _____ { 99% less than 10 microns diameter.
                    95% less than 5 microns diameter.
                    85% less than 3 microns diameter.
                    57% less than 1 micron diameter.
                    39% less than 0.1 micron diameter.
Aerosil _____ 0.015 to 0.020 micron diameter.
Linde _____ 0.030 micron diameter (average).
Syloid #72 _____ 1–5 microns diameter.
Cabosil _____ 0.015–0.020 micron diameter.

The Santocels are known to be made by the dehydration of silicic acid in an autoclave, the silicic acid having been obtained by neutralizing sodium silicate with an acid. Aerosil and Cabosil are known to be made by the burning of silicon tetrachloride or other similar compounds. The other types of silica are believed to be made by modifications of either of these two basic processes.

Any type of starch, for example corn starch, wheat starch, and tapioca starch may be used. Under some circumstances where the starch particles are very large as in potato starch it may be advantageous to cut down the particle size of the starch used by passing it through a colloid mill.

The following materials may be used as binders for the particles of the starch; polyvinyl acetates, caseinates, gelatin, gum arabic and hydroxyethylcellulose. Any of these can be used if applied together with silica and starch in a precoat. If the starch and silica are added with the sensitizing solution the binder must also be added with this solution and must be compatible therewith. In this case, for example, polyvinyl acetate, gum arabic and hydroxyethylcellulose can be used.

It is also possible to apply a precoat containing starch, silica and a binder and then apply on top of this a sensitizing solution which also includes starch, silica and a binder.

In the precoat, the proportion of dry silica may vary up to about 6%, the proportion of dry starch up to about 20% and the proportion of polyvinyl acetate dispersion may vary up to 10% by weight of the coating solution or dispersion. If gelatin or gum arabic is used as the binder the proportion may vary up to about 3%. If the silica, starch and binder are added to the sensitizing solution the same proportions can be used as long as the binder is compatible with the rest of the solution.

The invention is illustrated by means of the following examples:

Example I

Coat a suitable base paper with a water solution containing:

|   | Percent |
|---|---|
| Non-colloidal silica (1–5 microns) (Syloid #72) | 2 |
| Cornstarch | 15 |
| Polyvinyl acetate dispersion (Gelva Emulsion S-98) | 2 |

After drying, the coated base paper is sensitized by coating it with a water solution containing:

|   | Percent |
|---|---|
| Citric acid | 2 |
| Thiourea | 3 |
| 1,3,6-naphthalene trisulfonic acid, trisodium salt | 3 |
| 4-dimethyl-amino-1-benzene diazonium chloride | 1.5 |
| 2,3-dihydroxy naphthalene-6-sulfonic acid, sodium salt | 3 |
| Glycerine | 3 |

After drying the sensitized paper, it is exposed to light under an original and developed by exposing it to ammonia vapors in a conventional developing machine. A clear image with good contrast and smoothness is obtained which is better than on non-precoated paper or on some other types of precoated paper. The smoothness obtained is much better than would be obtained if the silica were left out of the precoating solution.

Example II

To an aqueous sensitizing solution containing:

|   | Percent |
|---|---|
| Citric acid | 3 |
| Thiourea | 4 |
| 1,3,6-naphthalene trisulfonic acid, trisodium salt | 3 |
| 4-diethylamino-1-benzene diazonium chloride | 1.5 |
| 2,3 - dihydroxy naphthalene-6-sulfonic acid, sodium salt | 2.5 |
| Glycerine | 3 | are added

|   | |
|---|---|
| Non-colloidal silica (1–5 microns) | 2 |
| Cornstarch | 10 |
| Polyvinyl acetate dispersion (Elvacet 81–900) | 2 |

The solution is then coated on raw paper of the type commonly used for diazotype materials. After drying, exposure under an original and development with ammonia vapor a print with blue lines and excellent contrast and smoothness is obtained.

Example III

Wheat starch is used in the following sensitizing solution:

| | Percent |
|---|---|
| Tartaric acid | 1 |
| 4-ethyl benzyl amino-1-benzene diazonium chloride | 1.5 |
| Wheat starch | 5–10 |
| Polyvinyl acetate dispersion (Gelva Emulsion S–98) | 5 |
| Non-colloidal silica (1–5 microns) | 2 |

This solution is coated on a paper base sheet of the type normally used for producing semi-wet diazotype materials.

After drying the paper it is exposed under a positive and developed with an alkaline developer containing for example trisodium phosphate or potassium tetraborate as alkaline salts, phloroglucinol and resorcinol. A smooth image with excellent contrast is obtained. It has been found that 10–15% wheat starch is also satisfactory.

Example IV

A paper base sheet is coated with the precoating solution described in Example I, with the exception that instead of a polyvinyl acetate dispersion a vinyl copolymer such as Flexbond 800 is used. The sensitizing solution described in Example III containing additional starch is then applied over the precoated paper.

The paper is dried, exposed under an original and developed in an alkaline developing solution of the type described in Example III. The contrast of the prints obtained is even better than that of Example III.

Example V

Paper of the type commonly used in the diazotype process is precoated with the following aqueous dispersion:

| | Percent |
|---|---|
| Cornstarch | 10 |
| Colloidal silica (Cabosil) | 2 |
| Soluble casein | 2 |

The precoated paper is dried and then sensitized with the following solution:

| | Percent |
|---|---|
| Tartaric acid | 1 |
| 4-ethyl benzyl amino-1-benzene diazonium chloride | 1.5 |
| Aluminum sulfate | 0.5 |
| Gelatin | 0.3 |

After drying the paper is exposed under a positive and developed with a developer in water solution having a pH of 9.3 of the following composition:

900 parts water
55.0 parts potassium tetraborate-pentahydrate
2.8 parts of potassium hydroxide
4.5 parts of phloroglucinol
4.0 parts of resorcinol
8.5 parts of thiourea
.6 parts of hydroquinone-m-sulfonic acid potassium salt
.5 parts of the sodium salt of iso-propylnaphthalene sulfonic acid A blackline print with excellent smoothness is obtained.

Example VI

The usual type of paper is precoated with an aqueous dispersion containing:

| | Percent |
|---|---|
| Non-colloidal silica (Syloid #72) | 2 |
| Tapioca starch | 10 |
| Soluble casein | 4 |

The precoated paper is dried and then sensitized with the same sensitizing solution disclosed in Example V and developed with the developer solution mentioned therein.

Prints with good contrast and smoothness are obtained. Instead of the non-colloidal silica in the precoat, a colloidal silica like Cabosil M5 can also be used.

Example VII

The usual type of paper is precoated with the following aqueous dispersion:

20% by volume of a 10% solution of hydroxyethylcellulose WP09
10% tapioca starch
2% by weight of non-colloidal silica (Syloid 72)

The precoated paper is dried and then sensitized with a water solution containing:

| | Percent |
|---|---|
| By weight 4-ethyl benzylamino-1-benzene diazonium chloride | 1 |
| Saponin | 0.05 |
| Tartaric acid | 1 |

A very smooth coating is obtained which gives prints of good contrast after exposure and development in a suitable diazotype developer.

Example VIII

The usual type of paper is precoated with the following dispersion:

1% by weight gelatine (photoemulsion type)
2% non-colloidal silica (1–5 microns)
10% corn starch The paper is then sensitized with the sensitizer mentioned in Example VII to which has been added 5% by volume of a compatible polyvinylacetate dispersion. After exposure to light and development with a suitable developer, a print with good smoothness and contrast is obtained.

Example IX

The usual type of paper is precoated with the following dispersion:

| | Percent |
|---|---|
| Colloidal silica (Cabosil) | 1.8 |
| Corn starch | 9 |
| Gum arabic | 4 |

This paper is then sensitize with the sensitizing solution disclosed in Example VII. After exposure to ultraviolet light and development in a suitable developer, a black line print with very good contrast and smoothness is obtained.

The following information on starch was obtained from Chemistry and Industry of Starch, second edition, by Ralph W. Kerr, published in 1950 by the Academic Press Inc., New York, New York. The numerical values in the following table give the average, minimum, and the maximum size of various starch granules in microns.

| | Average size | Minimum size | Maximum size |
|---|---|---|---|
| Corn | 15 | 5 | 25–26 |
| Tapioca | 20 | 5 | 35 |
| Potato | | 15 | 100 |
| Wheat | | 2–10 | 35 |
| Sago | | 15 | 65 |
| Arrowroot | | 15 | 70 |
| Rice | | 3 | 8 |
| Barley | | 2–6 | 20–35 |
| Sorghum | 15 | 6 | 30 |
| Sweet Potato | | 10 | 25 |
| Waxy Maise | | 5 | 25 |

The starch granules used in the present invention are substantially larger generally over 10 microns compared to rice granules which are from 3 to 8 microns. The starch particles or granules of the present invention are non-swollen and do not serve as the binder and an additional binder is used to obtain the binding action independently of any appreciable binding action of the starch. Unexpected results are obtained by using a binder other than starch and large size starch particles other than rice starch particles and fine silica particles. The fine silica particles fill the spaces between the starch particles and the particle sizes have been selected to provide with the binder a substantially smooth surface for diazotype photosensitive material to obtain a uniform coating on paper giving uniform high quality prints in all areas of the paper.

It will therefore be seen that applicants have provided an inexpensive diazo sensitizing material producing high quality prints and it will also be understood that changes may be made in the precise method and materials used within the valid scope of the pending claims.

What is claimed is:

1. A photosensitive diazotype material comprising a paper base sheet, a precoat layer coated on said sheet, and a sensitizing layer comprising a photosensitive diazonium compound coated over said precoat layer on said sheet, said precoat layer comprising 5 to 15 parts of non-swollen starch particles selected from the group consisting of corn starch particles, tapioca starch particles, potato starch particles, wheat starch particles, sago starch particles, arrowroot starch particles, barley starch particles, sorghum starch particles, sweet potato starch particles, and waxy maize starch particles, and having a particle size range of 2 microns to 100 microns with an average particle size of at least 10 microns, 2 to 6 parts of finely divided silica having a particle size range of 0.015 micron to 10 microns with an average particle size no greater than 1 micron, and 1 to 5 parts organic binder selected from the group consisting of polyvinyl acetates, casein, caseinates, gelatine, gum arabic, and hydroxyethyl cellulose.

2. A material in accordance with claim 1 in which said starch particles are corn starch particles having a particle size range of 5 microns to 26 microns with an average size of at least 10 microns.

3. A material in accordance with claim 1 in which said starch particles are tapioca starch particles having a particle size range of 5 microns to 35 microns with an average size of at least 10 microns.

4. A material in accordance with claim 1 in which said starch particles are wheat starch particles having a particle size range of 2 microns to 35 microns with an average size of at least 10 microns.

5. A photosensitive diazotype material comprising a paper sheet and a photosensitive diazotype layer coated on said sheet, said layer comprising non-swollen starch particles selected from the group consisting of corn starch particles, tapioca starch particles, potato starch particles, wheat starch particles, sago starch particles, arrowroot starch particles, barley starch particles, sorghum starch particles, sweet potato starch particles and waxy maize starch particles, an organic binder selected from the group consisting of polyvinyl actates, casein, caseinates, gelatin, gum arabic and hydroxyethyl cellulose, finely divided silica, and a photosensitive diazonium compound, said starch particles having a particle size range of 2 microns to 100 microns with an average particle size of at least 10 microns, said silica having a particle size range of 0.015 micron to 10 microns with an average particle size no greater than 1 micron.

6. A material in accordance with claim 5 in which said starch particles are corn starch particles with a particle size range of 5 microns to 26 microns with an average particle size of at least 10 microns.

7. A material in accordance with claim 5 in which said starch particles are tapioca starch particles with a particle size range of 5 microns to 35 microns with an average particle size of at least 10 microns.

8. A material in accordance with claim 5 in which said starch particles are wheat starch particles with a particle size range of 2 microns to 35 microns with an average particle size of at least 10 microns.

9. A material in accordance with claim 5 in which said layer includes a coupling component.

References Cited in the file of this patent

UNITED STATES PATENTS

| | | |
|---|---|---|
| 1,276,492 | Coffee | Aug. 20, 1918 |
| 1,738,992 | Flood | Dec. 10, 1929 |
| 1,826,002 | Jennings | Oct. 6, 1931 |
| 2,230,656 | Scholler | Feb. 4, 1941 |
| 2,537,114 | Young et al. | Jan. 9, 1951 |
| 2,780,547 | Ferzola et al. | Feb. 5, 1957 |
| 2,824,000 | Eckhardt | Feb. 18, 1958 |
| 3,047,427 | Dratz | July 31, 1962 |

FOREIGN PATENTS

| | | |
|---|---|---|
| 762,140 | Great Britain | Nov. 21, 1956 |
| 825,361 | Great Britain | Dec. 16, 1959 |